US008302550B1

(12) United States Patent
Woods

(10) Patent No.: US 8,302,550 B1

(45) Date of Patent: Nov. 6, 2012

(54) ANTENNA COVER AND TOPPER DEVICE

(76) Inventor: Michael R. Woods, Inverness, FL (US)

( * ) Notice: Subject to any disclaimer, the term of this patent is extended or adjusted under 35 U.S.C. 154(b) by 152 days.

(21) Appl. No.: 12/831,580

(22) Filed: Jul. 7, 2010

(51) Int. Cl.
*G09F 21/04* (2006.01)
*B60R 13/00* (2006.01)

(52) U.S. Cl. .................................................... 116/28 R

(58) Field of Classification Search ................ 116/28 R, 116/30; 428/31; 40/589, 590, 591, 592; 343/715; 473/176
See application file for complete search history.

(56) References Cited

U.S. PATENT DOCUMENTS

| | | | | |
|---|---|---|---|---|
| 2,586,643 | A * | 2/1952 | Garlow | 362/540 |
| 3,638,341 | A * | 2/1972 | Holmes | 40/479 |
| 3,768,434 | A * | 10/1973 | Pinter | 116/63 P |
| 4,727,822 | A * | 3/1988 | Wikkerink | 116/174 |
| 4,972,795 | A | 11/1990 | Mace | |
| 5,268,703 | A | 12/1993 | Wingard | |
| 5,836,261 | A | 11/1998 | Sutton | |
| 6,247,423 | B1 | 6/2001 | Ingram et al. | |
| 6,609,476 | B1 * | 8/2003 | Lorenzana et al. | 116/173 |
| 6,637,365 | B1 * | 10/2003 | Adamski | 116/28 R |
| 6,760,988 | B2 * | 7/2004 | Bardeleben | 40/591 |
| 2006/0040072 | A1 | 2/2006 | Swanson | |
| 2008/0127881 | A1 * | 6/2008 | Stegmann et al. | 116/173 |

FOREIGN PATENT DOCUMENTS

| | | | |
|---|---|---|---|
| JP | 2005165310 | A * | 6/2005 |
| WO | WO 0016295 | A2 * | 3/2000 |

* cited by examiner

*Primary Examiner* — R. A. Smith

(57) ABSTRACT

An antenna cover and topper device including a sleeve having a top end and a bottom end having a pair of V-shaped notches therein, a threaded housing disposed within the top end, a gap below the housing, a hollow cylindrical upper bushing below the gap, a lower bushing within a sleeve bottom end, a cavity disposed between the upper and lower bushings, a display member having holes aligned in upper and lower edges thereof, and a bolt removably engaging the holes and the threaded opening to secure the display member to the sleeve. A vehicle antenna engages a lower bushing lower opening, the cavity, and an upper bushing aperture with the antenna top ball secured within the gap. A clamp removably secures the antenna base top section into lower bushing.

6 Claims, 4 Drawing Sheets

ANTENNA COVER AND TOPPER DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of decorative vehicle antenna cover and topper devices are known in the prior art. However, what is needed is a vehicle antenna cover and topper device including, in an assembled position, a sleeve having a top end and a bottom end having a pair of V-shaped notches therein, a threaded housing disposed within the top end, a gap below the housing, a hollow cylindrical upper bushing below the gap, a lower bushing within a sleeve bottom end, a cavity disposed between the upper and lower bushings, a display member having holes aligned in upper and lower edges thereof, and a bolt removably engaging the holes and the threaded opening to secure the display member to the sleeve. A vehicle antenna engages a lower bushing lower opening, the cavity, and an upper bushing aperture with the antenna top ball removably secured atop an outer edge of the upper bushing within the gap. A clamp removably secures a vehicle antenna base top section within sleeve bottom end.

FIELD OF THE INVENTION

The present invention relates to vehicle antenna covers and toppers, and more particularly, to an antenna cover and topper device which, in an assembled position, includes a sleeve having a upper housing disposed at a top end thereof, the upper housing having a threaded opening disposed therein, an upper bushing disposed below the housing, a gap disposed between the upper housing and the upper bushing, a lower bushing disposed at a sleeve bottom end, the lower bushing having a lower opening, a cavity disposed between the upper and lower bushings, the lower and upper bushings removably receiving a vehicle antenna therethough and which also includes a display member having aligned holes in upper and lower edges thereof and a bolt which engages the holes and the threaded opening of the upper housing to secure the display member to the sleeve. A clamp secures the base top section of the antenna within the lower bushing lower opening.

SUMMARY OF THE INVENTION

The general purpose of the present antenna cover and topper device, described subsequently in greater detail, is to provide an antenna cover and topper device which has many novel features that result in an antenna cover and topper device which is not anticipated, rendered obvious, suggested, or even implied by prior art, either alone or in combination thereof.

To accomplish this, the present antenna cover and topper device, in an assembled position, includes an elongated cylindrical sleeve having a continuous outer wall, a top end, and a bottom end. An upper housing, having a bottom edge, is disposed within the top end of the sleeve and has a threaded opening centrally longitudinally disposed therein. A gap is disposed directly below the upper housing bottom edge. A hollow cylindrical rubber upper bushing is removably disposed within the sleeve directly below the gap. The upper bushing has a centrally longitudinally disposed aperture running continuously therethrough, and a slit continuously longitudinally disposed along an exterior wall of the bushing. The bushing further has a diameter and length approximately the same as a diameter and length of the upper housing, respectively, to ensure a tight fit around a vehicle antenna. A hollow cylindrical rubber lower bushing identical to the upper bushing is removably disposed within the sleeve bottom end. A cavity is disposed within the sleeve between the upper and lower bushings. A two-bolt pipe clamp removably secures the vehicle antenna lower end within the sleeve bottom end.

The device also provides a display member which is removably threadingly attached atop a top ball of a vehicle antenna. A display member can be annulet-shaped, as shown, as well as an endless variety of other shapes and also colors and designs. The display members can be utilized for advertising.

To use the present vehicle antenna cover and topper device, a user places the present device into an assembled position by first pushing the vehicle antenna base top section within the lower bushing lower opening. The user then slides a lower end of the vehicle antenna through the lower bushing second slit and into the lower opening. The user slides an upper end of the vehicle antenna through the first slit of the upper bushing and into the aperture with the top ball of the vehicle antenna positioned adjacent to an outer edge of the upper bushing. The user then slides the sleeve over the upper bushing and the lower bushing, pressing the notches inwardly while sliding the sleeve over the lower bushing. The user then secures the clamp over the sleeve bottom end to secure the base top end of the vehicle antenna within the lower bushing lower opening. The user then slides the upper housing into the sleeve top end and places the display member atop the sleeve, aligning the holes with the upper housing threaded opening, then slides washer between the lower edge of the display member and the sleeve, and slides a bolt through the holes and washer, and threadingly engages the bolt with the threaded opening.

Thus has been broadly outlined the more important features of the present antenna cover and topper device so that the detailed description thereof that follows may be better understood and in order that the present contribution to the art may be better appreciated.

Numerous objects, features and advantages of the present antenna cover and topper device will be readily apparent to those of ordinary skill in the art upon reading the following detailed description of presently preferred, but nonetheless illustrative, examples of the present antenna cover and topper device when taken in conjunction with the accompanying drawings. In this respect, before explaining the current examples of the present antenna cover and topper device in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the antenna cover and topper device kit. It is therefore important that the claims be regarded as including such equivalent constructions insofar as they do not depart from the spirit and scope of the present invention.

Objects of the present antenna cover and topper device, along with various novel features that characterize the invention are particularly pointed out in the claims forming a part of this disclosure. For better understanding of the antenna cover and topper device, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
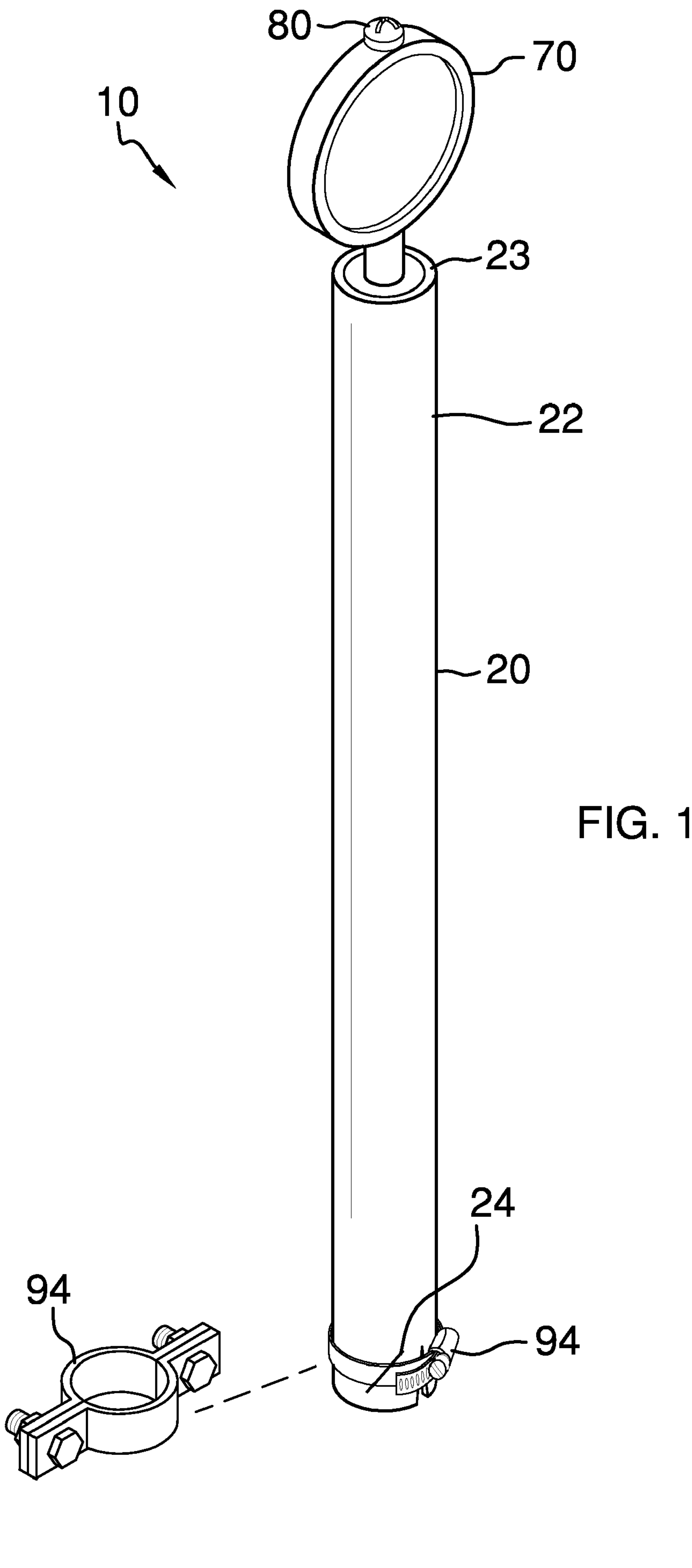
FIG. 1 is an isometric view.
Figure 2A:
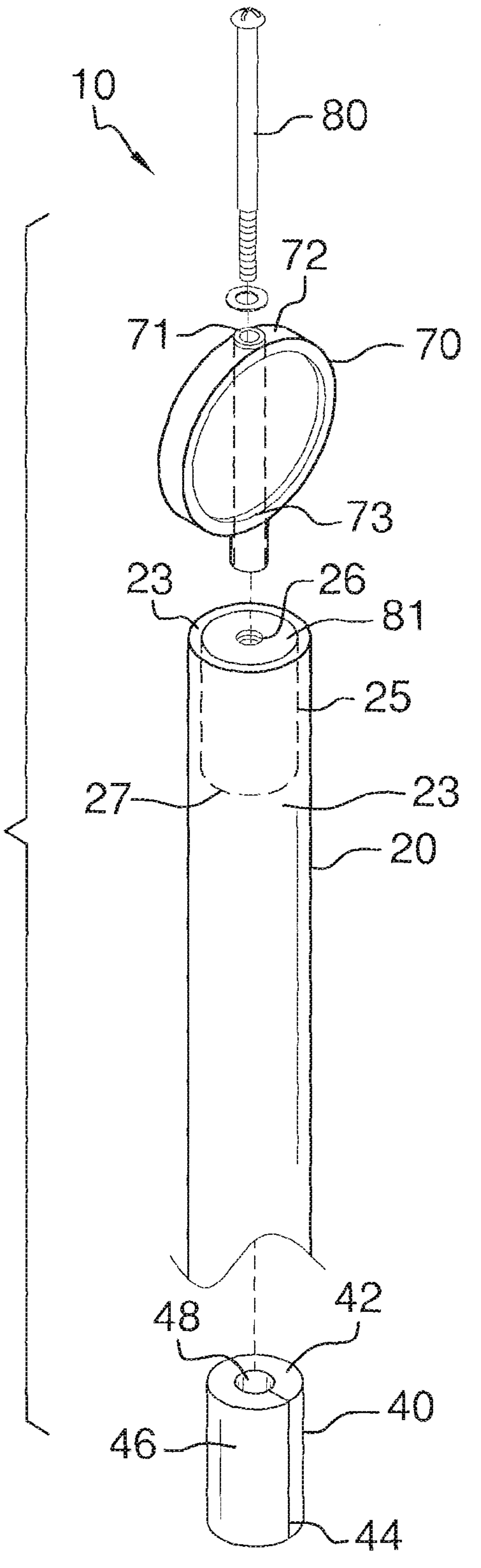
FIGS. 2A and 2B are exploded isometric views of opposite ends.
Figure 2B:
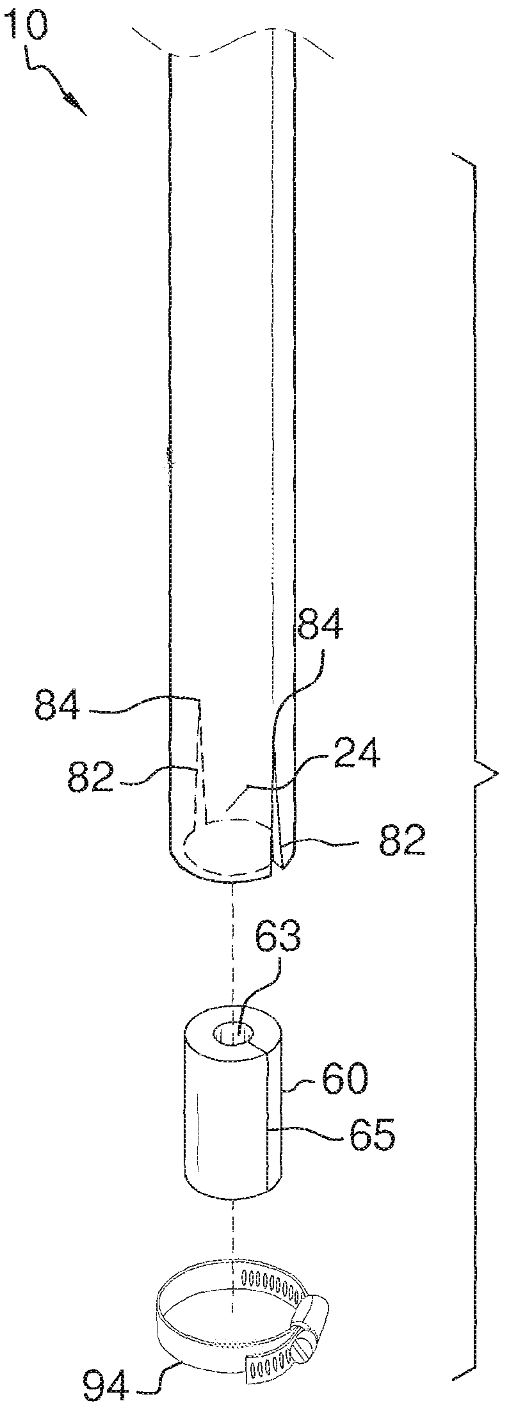
Figure 3:
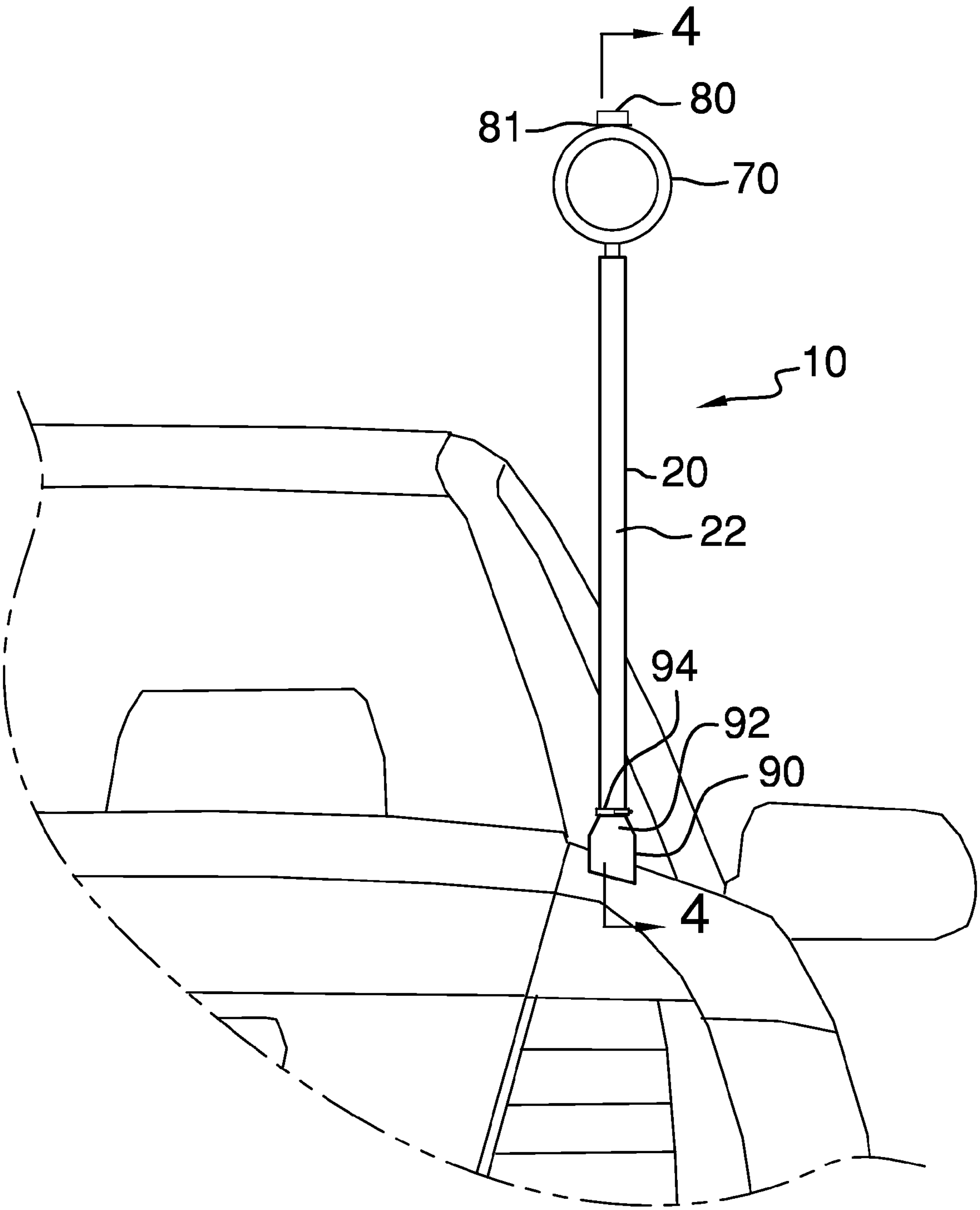
FIG. 3 is an in-use front elevation view.

With reference now to the drawings, and in particular FIGS. 1 through 4*b* thereof, example of the instant antenna cover and topper device employing the principles and concepts of the present antenna cover and topper device and generally designated by the reference number 10 will be described.

Referring to FIGS. 1 through 4B a preferred embodiment of the present antenna cover and topper device 10 is illustrated. The antenna cover and topper device 10 is used to stablize a vehicle antenna 90 while securing a display member above the top ball 97 of the vehicle antenna. The device 10, in an assembled position, includes an elongated cylindrical sleeve 20 having a continuous outer wall 22, a top end 23, and a bottom end 24. An upper housing 25, having a bottom edge 27, is disposed within the sleeve 20 top end 23. A threaded opening 26 is centrally longitudinally disposed within the upper housing 25 and the sleeve 20 top end 23. The upper housing 25 has a diameter slightly smaller than a diameter of the sleeve 20 to permit the upper housing 25 to snuggly fit within the sleeve.

The antenna cover and topper device 10 also includes a hollow cylindrical rubber upper bushing 40, having an outer edge 42, the upper bushing 40 removably disposed within the sleeve 20 directly below the gap 30. The upper bushing 40 has a centrally disposed aperture 48 running continuously therethrough. A first slit 44 is continuously longitudinally disposed along an exterior wall 46 of the upper bushing 40. The upper bushing 40 further has a diameter and length approximately the same as a diameter and length of the upper housing 25, respectively, to ensure a tight fit around a vehicle antenna 90 to prevent the antenna 90 from bending and to prevent the upper bushing 40 from falling downwardly within the sleeve 20.

A cylindrical gap 30 is disposed between the upper housing 25 bottom edge 27 and the upper bushing 40 outer edge 42.

A hollow cylindrical rubber lower bushing 60 identical to the upper bushing 40 is removably disposed within the sleeve 20 bottom end 24. A continuous cylindrical lower opening 63 centrally longitudinally extends through the lower bushing 60. A second slit 65 is continuously longitudinally disposed along the lower bushing 60. A cavity 67 is disposed between the upper and lower bushings 40, 60.

The present antenna cover and topper device 10 also includes at least one display member 70 having a hole 71 centrally aligned through an upper edge 72 and a lower edge 73 of the display member 70.

A bolt 80 removably threadingly engages the hole 71 disposed in the upper edge 72 and the lower edge of the display member and the threaded opening 26. The bolt 80 may have a diameter smaller than the hole 71 wherein the display member spins around the bolt. A washer 81 may be placed between the lower edge 73 of the display member 70 and the sleeve 20. The bolt 80 removably engages the washer 81.

The sleeve 20 bottom end 24 also includes a pair of opposing V-shaped notches 82, each notch 82 having an apex 84.

The antenna cover and topper device 10 also includes a clamp 94, which is a worm gear clamp or, in the alternative, a two-bolt pipe clamp as shown in FIG. 1. The clamp 94 removably secures a base top section 92 of the vehicle antenna 90 within the bottom end 24 of the sleeve 20 to stabilize the vehicle antenna 90 and keep the vehicle antenna 90 from breaking while also supporting the display member 80 attached thereto. The clamp 94 also tightens the notches 82 to achieve a tighter fit of the bottom end 24 around the lower bushing 60 to secure the vehicle antenna 90 within the lower bushing 60.

Figure 4A:
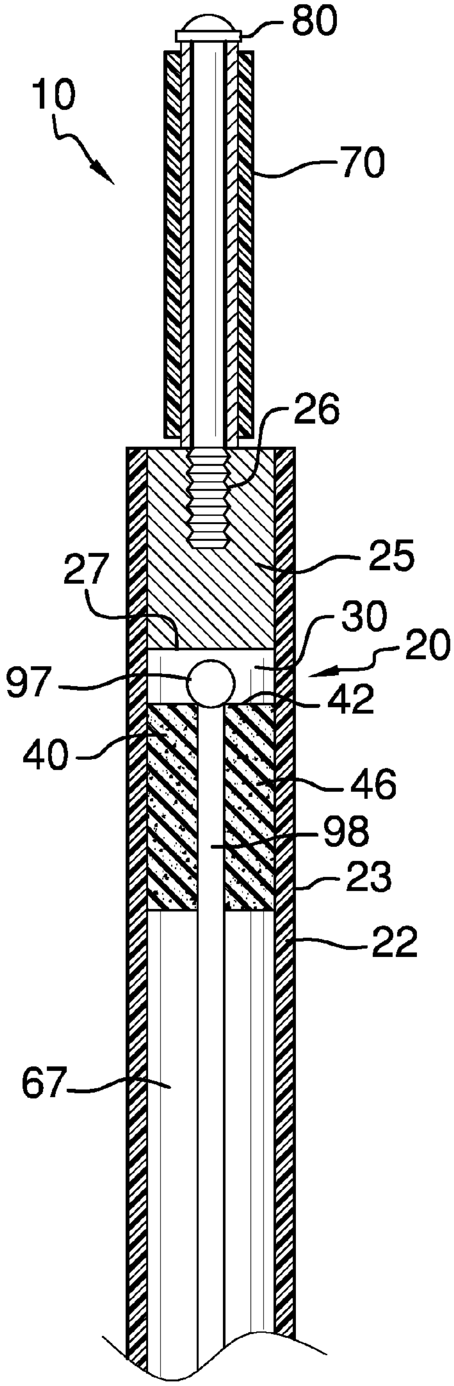
FIGS. 4A and 4B are cross-section views taken along line 4-4 of FIG. 3 in an assembled position.
Figure 4B:
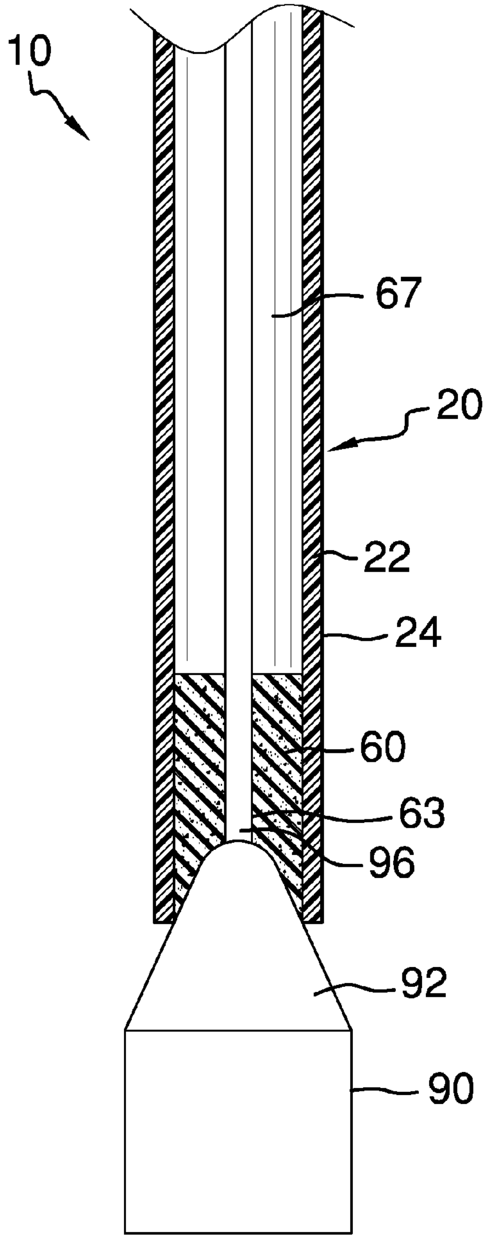

USE:

To use the present antenna cover and topper device 10, a user must assemble the device 10 into an assembled position, as shown in FIGS. 4A and 4B, which starts by pushing the vehicle antenna 90 base top section 92 within the lower bushing 60 lower opening 63. The user then slides a lower end 96 of the vehicle antenna 90 through the lower bushing 60 second slit 65 and into the lower opening 63. The user slides an upper end 98 of the vehicle antenna 90 through the first slit 44 of the upper bushing 40 and into the aperture 48 with the top ball 97 of the vehicle antenna 90 positioned adjacent to an outer edge 42 of the upper bushing 40. The user then slides the sleeve 20 over the upper bushing 40 and the lower bushing 60, pressing the notches 82 inwardly while sliding the sleeve 20 over the lower bushing 60. The user then secures the clamp 94 over the sleeve 20 bottom end 24 to secure a base top section 92 of the vehicle antenna 90 within the lower bushing 60 lower opening 63. The user then slides the upper housing 25 into the sleeve 20 top end 23 and places the display member atop the sleeve 20, aligning the holes 71 with the upper housing 25 threaded opening 26, then slides a bolt 80 through the holes 71 and a washer 81 disposed between the lower edge 73 of the display member 70 and the sleeve 20, and then threadingly engages the bolt 80 with the threaded opening 26.

With respect to the above description then, it is to be realized that the optimum dimensional relationships for the parts of the present antenna cover and topper device to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as “front”, “back”, “in”, “out”, “downward”, “upper”, “lower”, and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An antenna cover and topper device comprising:

an elongated cylindrical sleeve having a continuous outer wall, a top end, and a bottom end;

an upper housing disposed within the sleeve top end, the upper housing having a bottom edge and further having a diameter slightly smaller than a diameter of the sleeve wherein the upper housing fits snuggly within the sleeve;

a threaded opening centrally longitudinally disposed within the upper housing and the top end of the cylindrical sleeve;

a cylindrical gap disposed within the upper portion of the sleeve directly below the upper housing bottom edge;

a hollow cylindrical rubber upper bushing disposed within the sleeve directly below the gap, the upper bushing having a centrally disposed aperture running continuously longitudinally therethrough;

wherein the upper bushing has a diameter and length approximately the same as a diameter and length of the upper housing, respectively;

a first slit continuously longitudinally disposed along an exterior wall of the upper bushing;

a hollow cylindrical lower bushing identical to the upper bushing removably disposed within the sleeve bottom end, the lower bushing having a diameter and length as the upper bushing diameter and length, respectively;

a continuous cylindrical lower opening centrally longitudinally extending through the lower bushing;

a second slit continuously longitudinally disposed along an exterior wall of the lower bushing;

at least one display member having a hole centrally aligned through each of an upper edge and a lower edge thereof, the holes selectively aligned with the threaded opening; and a clamp removably securing a base top section of the vehicle antenna within the lower bushing lower opening.

2. The vehicle antenna and topper of claim 1 further comprising a bolt removably threadingly engaging the display member hole disposed in the upper edge and the lower edge of the display member and the threaded opening.

3. The vehicle antenna and topper of claim 2 wherein the bolt has a smaller diameter than the hole;

wherein the display member spinningly engages the bolt.

4. The antenna and topper of claim 3 wherein the display member is annulet-shaped.

5. The vehicle antenna and topper of claim 4 wherein the upper bushing and the lower bushing are formed of rubber.

6. The vehicle antenna and topper of claim 5 wherein a washer is disposed between the lower edge of the display member and the sleeve;

wherein the bolt further removably engages the washer.

* * * * *